(12) United States Patent
Crutcher et al.

(10) Patent No.: US 10,515,341 B2
(45) Date of Patent: Dec. 24, 2019

(54) COMPUTER COMMUNICATION NETWORK FOR ROUTING COMMUNICATIONS BASED ON IDENTIFIED INFORMATION CLUSTERS

(71) Applicant: STATE FARM MUTUAL AUTOMOBILE INSURANCE COMPANY, Bloomington, IL (US)

(72) Inventors: Sherri Lynn Crutcher, Fairbury, IL (US); Surendra Kumar Karnatapu, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 191 days.

(21) Appl. No.: 15/408,452

(22) Filed: Jan. 18, 2017

(65) Prior Publication Data
US 2018/0204182 A1    Jul. 19, 2018

(51) Int. Cl.
| | |
|---|---|
| *G06F 16/00* | (2019.01) |
| *G06Q 10/10* | (2012.01) |
| *G06N 20/00* | (2019.01) |
| *G06F 16/35* | (2019.01) |
| *G06F 17/27* | (2006.01) |

(52) U.S. Cl.
CPC ........... *G06Q 10/103* (2013.01); *G06F 16/35* (2019.01); *G06N 20/00* (2019.01); *G06F 17/2775* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,884,305 | A  * | 3/1999 | Kleinberg | G06F 16/278 |
| 6,460,036 | B1 * | 10/2002 | Herz | G06Q 30/02 |
| | | | | 707/748 |
| 6,850,252 | B1 * | 2/2005 | Hoffberg | G06K 9/00369 |
| | | | | 348/E7.061 |
| 7,483,871 | B2 * | 1/2009 | Herz | G06Q 30/02 |
| 7,664,718 | B2 * | 2/2010 | Acharya | G06K 9/6219 |
| | | | | 706/45 |
| 7,761,394 | B2 * | 7/2010 | Acharya | G06K 9/6219 |
| | | | | 706/45 |
| 7,813,822 | B1 * | 10/2010 | Hoffberg | G06K 9/00369 |
| | | | | 381/73.1 |
| 7,974,714 | B2 * | 7/2011 | Hoffberg | G06K 9/00369 |
| | | | | 360/75 |

(Continued)

*Primary Examiner* — Farhan M Syed

(57) ABSTRACT

A method for processing and routing client communications based on information contained in the communications, the method comprising: receiving client communications in one or more formats selected from verbal, electronic, and physical; converting the received client communications into formatted electronic records; creating system records for the formatted electronic records; identifying clusters from the information in the formatted electronic records; categorizing the identified clusters; identifying clients from the information in the formatted electronic records; saving the system records and the formatted electronic records in data files for the identified clients; identifying business departments charged with handling identified clusters; and routing the system records and formatted electronic records to the identified business departments, wherein the system records and formatted electronic records are added to workflow of the business departments.

8 Claims, 5 Drawing Sheets

(56) References Cited

U.S. PATENT DOCUMENTS

| | | | | |
|---|---|---|---|---|
| 8,171,032 | B2* | 5/2012 | Herz | G06Q 30/02 |
| | | | | 707/748 |
| 9,524,345 | B1* | 12/2016 | Vanderdrift | G06F 16/24578 |
| 2003/0037041 | A1* | 2/2003 | Hertz | G06Q 30/02 |
| 2007/0053513 | A1* | 3/2007 | Hoffberg | G06K 9/00369 |
| | | | | 380/201 |
| 2007/0271292 | A1* | 11/2007 | Acharya | G06K 9/6219 |
| 2008/0294584 | A1* | 11/2008 | Herz | G06Q 30/02 |
| | | | | 706/46 |
| 2012/0289147 | A1* | 11/2012 | Raleigh | H04L 67/2847 |
| | | | | 455/3.06 |
| 2013/0238751 | A1* | 9/2013 | Raleigh | H04L 67/20 |
| | | | | 709/217 |
| 2013/0238761 | A1* | 9/2013 | Raleigh | H04L 67/306 |
| | | | | 709/219 |
| 2013/0238762 | A1* | 9/2013 | Raleigh | H04L 67/306 |
| | | | | 709/219 |
| 2013/0238777 | A1* | 9/2013 | Raleigh | H04L 67/1097 |
| | | | | 709/223 |
| 2016/0179849 | A1* | 6/2016 | Dubois | G06F 16/211 |
| | | | | 707/803 |
| 2017/0017618 | A1* | 1/2017 | Dunn | G06F 17/227 |
| 2017/0208138 | A1* | 7/2017 | Baxter | H04L 67/16 |

* cited by examiner

COMPUTER COMMUNICATION NETWORK FOR ROUTING COMMUNICATIONS BASED ON IDENTIFIED INFORMATION CLUSTERS

TECHNICAL FIELD

The present disclosure relates generally to systems and methods for automatically routing messages to recipients based on message content.

BACKGROUND

One aspect of a business may be client communications, wherein each customer has a particular case file, matter, project, etc. Where the business provides products and/or services related voluminous client files, communications between the business and the voluminous clients can be extremely burdensome. When an individual communication is received from a client, the business must quickly determine: (1) to which project the communication should be associated; and (2) to which business department the communication should directed.

Prior art communication systems typically comprise many customer service representatives and a significant communication infrastructure. Upon receipt of the customer communications, the customer service representatives must associate all client communications with the correct client file, whether the communications are email, telephone, facsimile, etc. Each communication must be documented. For example, a telephone conversation must be transcribed or converted into a written document, an email must be saved as a document, a text message must be saved as a document, a photographs or videos must be saved in a usable format. However saved or documented, the customer service representatives must then associate the communication the appropriate client file. Next, the customer service representative must create a message directed to the business department tasked with responding to the client's communication, wherein the client communication is attached to or otherwise referenced in the message.

In one prior art communication system, verbal client communications are received via a telephone call center, email client communications are received via a website portal, and paper communications are received via regular mail. The system requires human intervention to forward phone, email and mail communications from clients to the departments charged with handling the client files. The system requires customer representatives to create electronic documents that are saved in the client files and then attached to emails to be sent to the handling departments. For example, mailed communications must be scanned in a word searchable format. The clients are unable to directly call, email or mail the handling departments because contact information for the handling departments is unknown to the clients and/or the clients do not know which departments are charged with handling the particular issues being presented by the clients.

In some systems, as many as 700,000 client communications are processed per day. Communications may be miscategorized. The time to route client communications may be too long. Associating the client communication with the correct client file is particularly troubling. Misdirected client communications may become temporarily misplaced or even lost, which results in delayed responses or nonresponses. When a client calls, emails or mails a general question, judgments must be made by the intake customer service representative to determine to which department to forward the question. When the intake customer service representative looks at a client communication, the representative needs a full understanding of the customer's file to place the client's question in context. If the customer service representative does not fully understand the client's file and the client's question, misrouting becomes more likely.

In some systems, failures to property categorize and forward client communications can raise compliance issues where government regulations set specific standards regarding confidentiality, timeliness, etc.

There is a need for communication systems that intake hundreds of thousands of client communications, via telephone, email, and mail, associate the client communications with client files, and route the client communications to departments charged with responding/handling the customer communications.

SUMMARY

In accordance with the teachings of the present disclosure, disadvantages and problems associated with existing marketing information systems and methods have been reduced.

An aspect of the invention provides a computer communication network for processing and routing client communications based on information contained in the communications, the computer network comprising: (i) an intake system comprising: a non-transitory computer readable media having stored thereon at least one intake software application; a processor, wherein said processor upon execution of the intake software application, is configured to: receive client communications in one or more formats selected from verbal, electronic, and physical; convert the received client communications into formatted electronic records; and transmit the formatted electronic records; (ii) a record distribution system comprising: a non-transitory computer readable media having stored thereon at least one distribution software application; a processor, wherein said processor upon execution of the distribution software application, is configured to: receive the formatted electronic records from the intake system; create system records for the formatted electronic records; identify clusters from the information in the formatted electronic records; categorize the identified clusters; identify clients from the information in the formatted electronic records; save the system records and the formatted electronic records in data files for the identified clients; identify business departments charged with handling identified clusters; and route the system records and formatted electronic records to the identified business departments, wherein the system records and formatted electronic records are added to workflow of the business departments; and (iii) a record handling system that allows users to process system records and formatted electronic records.

According to one aspect of the invention, there is provided a method for processing and routing client communications based on information contained in the communications, the method comprising: receiving client communications in one or more formats selected from verbal, electronic, and physical; converting the received client communications into formatted electronic records; creating system records for the formatted electronic records; identifying clusters from the information in the formatted electronic records; categorizing the identified clusters; identifying clients from the information in the formatted electronic records; saving the system records and the formatted electronic records in data files for the identified clients; identifying business departments charged with handling identified clusters; and routing the system records and formatted electronic records to the identified business departments, wherein the system records and formatted electronic records are added to workflow of the business departments.

According to a further aspect of the invention, a business entity may provide its customers with the capability of emailing customer representatives directly if he/she have any questions related to a product/service. Since customers do not know which customer representatives are responsible for handling particular questions, the invention provides a way to intelligently deliver the question/query to a right customer representative. For correct delivery, the invention leverages informational science to categorize the email based on predefined categories. This content based analyzer may help to categorize the email depending on the weightage/ranking of the words and linguistic semantics structures to accurately identify the subject category. For example: if a customer has a question in reference to a medical bill then invention may determine the customer representative to be a medical customer service representative. The invention may provide an intelligent, automated path to email the correct claim customer service handler/team by utilizing a content based analyzer, coupled with predefined categories, to categorize the email based on factors such as weight, rank, and linguistic semantics structure. This method may resolve the manual process of reading the email and routing it to appropriate customer service representative.

BRIEF DESCRIPTION OF THE DRAWINGS

A more complete understanding of the present embodiments may be acquired by referring to the following description taken in conjunction with the accompanying drawings, in which like reference numbers indicate like features, and wherein.

DETAILED DESCRIPTION

Preferred embodiments are best understood by reference to FIGS. 1-4 below in view of the following general discussion. The present disclosure may be more easily understood in the context of a high level description of certain embodiments.

Figure 1:
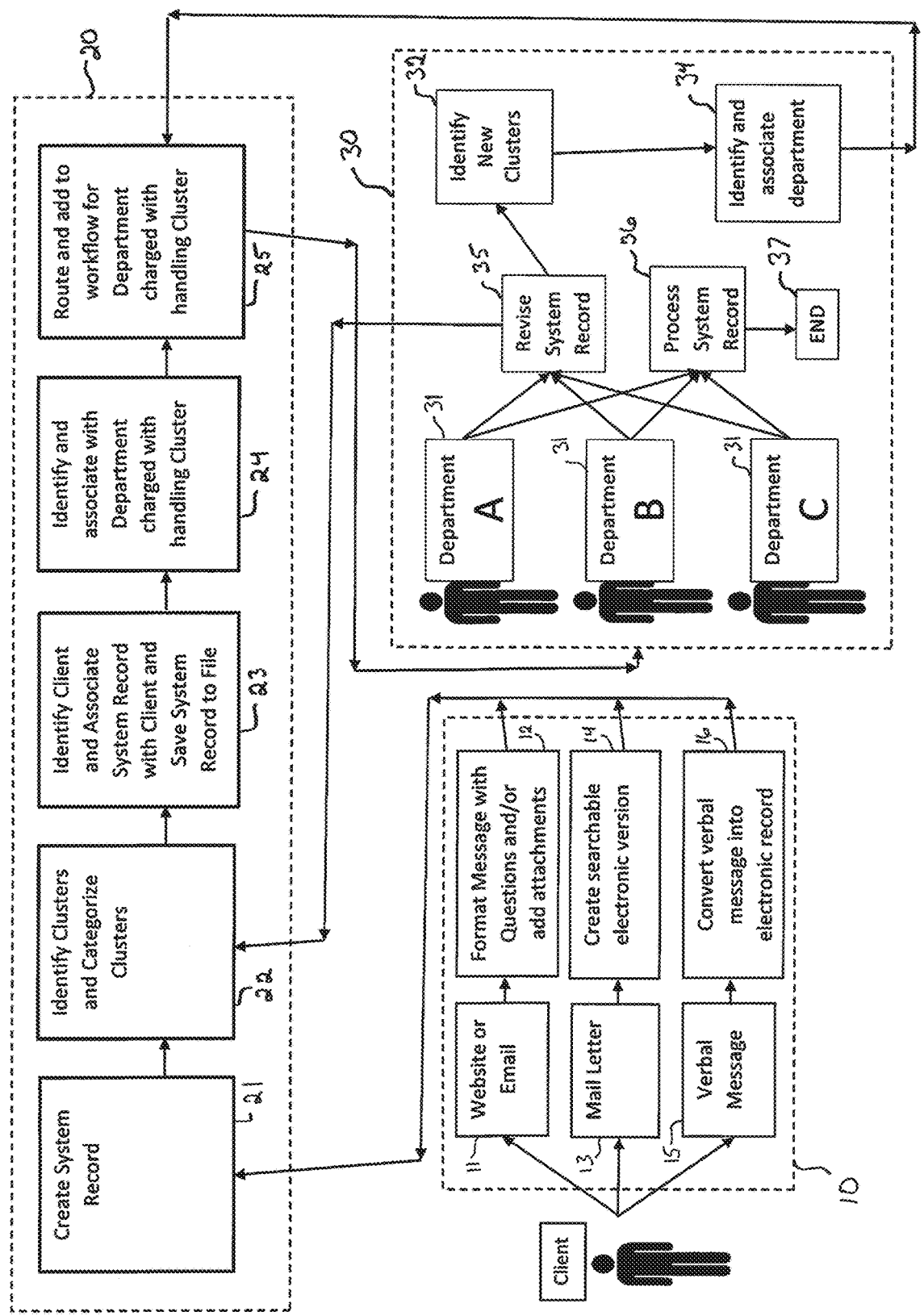
FIG. 1 illustrates a system embodiment of the invention comprising an intake system, a record distribution system and a record handling system, wherein each system performs process steps.

An embodiment of the invention is shown in FIG. 1. A client may input information into an intake system 10, wherein three separate methods are illustrated. Client information may include information or data of any kind. For example, the client either provide information or request information related to her file (matter, project, event, etc.). The information provided may include, for example, pictures or video, financial information, personal identification information, medical records, accident reports, documents, etc. The client may request information including, for example, status update information, pictures or videos, financial information, documents, etc.

First, a client may communicate with the entity via an electronic message. The client may log into a website and send a message, or send an email directly to a general email address. The client may simply type a message and adds attached files, which files may include document, image, spreadsheet, video files, etc. The electronic message, text, or email may be received 11 by the intake system 10. The intake system 10 then formats 12 the electronic message, email and attached files as necessary to ensure the information is in a format understandable to the system.

Second, a client may communicate with the entity via a physical letter sent via a mail service or carrier. In addition to a letter, the client may add reports, personal documents, photographs, physical samples, electronic memory devices containing additional information, etc. The physical letter and/or additional materials may be received 13 by the intake system 10. The intake system 10 then creates 14 electronic versions of physical materials. For example, a paper letter may be converted into a searchable .pdf or Word document file. Photographs may be scanned and saved as electronic .jpeg files, or any other format. Electronic files from an electronic memory device may be saved to a local database.

Third, a client may communicate with the entity via a verbal communication. The verbal communication may be received 15 as a recorded message or a live telephone conversation. The client may leave a recorded voice mail message that may be forwarded for latter processing or the verbal message may be a recorded conversation with a customer service representative. The verbal message is converted 16 to an electronic format such as a searchable .pdf or Word document file. Alternatively, the customer may communicate information to a customer service representative that populates blanks of a fillable form with the client information, wherein the form is then saved in electronic format. Optical Character Recognition (OCR) software may be used to convert documents to searchable formats.

The client communications received by the intake system 10 are transmitted to the record distribution system 20. FIG. 1 further illustrates that the record distribution system 20 processes electronic records of client communication by: creating 21 a system record; identifying and categorizing 22 the clusters; identifying 23 client and associate system records with client and saving system record to a file; identify and associate 24 with department charged with handling cluster; and routing and adding 25 workflow for department charged with handling cluster.

In the record creating step 21, the record distribution system 20 receives the electronic document from the intake system 10. The received document may be an email, an attachment to an email, or any other electronic record created by the client or the intake system 10. Upon receipt of the electronic document from the intake system 10, the record distribution system makes a corresponding system record, which enables the record distribution to track the electronic document.

In the cluster identifying step 22, the record distribution system 20 categorizes the question or information presented by the client. Clusters are categories of information that fall within the scope of responsibility of different business units or departments. Individual electronic documents received from the intake system 10 may comprise information that may be subdivided so as to fall within a plurality of clusters, so that a plurality of clusters may be identified for a single electronic document. The record distribution system may use language processing and/or machine learning algorithms to improve initial document processing. The system may perform a topic extraction based on factors, for example a topic extraction may be based on capitalization. The topic extraction may be based on metadata of the formatted electronic records. The system may perform Natural Language Processing (NLP) based on identification of key words or phrases in the formatted electronic records.

In the cluster identifying step 22, the record distribution system 20 may utilize Natural Language Processing (NLP) to identify key words or phrases in portions of the formatted electronic records, the portions including for example, headlines, titles, subject lines, headings, abstracts, captions, hashtags, etc. The natural language processor may be implemented in JavaScript and may run in any modern JavaScript environment (e.g. Webkit, NodeJS, Internet Explorer, etc.).

In the cluster identifying step 22, the record distribution system 20 may filter the formatted electronic records by comparing or matching terms and phrases in the records with specific rules. A specialized rule language may allow for complex conditional statements in filters. The identifying step 22 may be based on the occurrences of particular pieces of information in the formatted electronic record and a given sensitivity criteria, segmenting one or more pieces of information in the formatted electronic record as representing clusters.

A machine learning algorithm may be used in the cluster identifying step 22. Clustering is the partitioning of a data set into subset (clusters), so that the data in each subset share some common trait according to some defined measure. Machine learning may regard data clustering as a form of unsupervised learning. To cluster client communications, two algorithms may be used: hierarchial algorithm (to find successive clusters using previously established clusters) and partitional algorithm (to determine all clusters at once). A machine learning algorithm may be configured to learn from past client communications to more accurately cluster current client communications. Prior communications to/from a client or similarly situated clients may be tracked, recorded and associated with weights, and factored into the machine learning algorithm. The invention may use a number of computational intelligence techniques with different learning methods. An unsupervised learning method is used for identifying information clusters in client communications wherein predefined key words are used to identify clusters. As the system identifies clusters, the system may be trained with an appropriate learning algorithm, for example, a backpropagation algorithm that trains a neural network based on a small number of key words and/or phrases. Thereafter, a support vector machine may be used for another identifier of clusters using a larger number of key words and/or phrases. A combined cluster identifier may be produced to perform the identification task at three different operating points.

The record distribution system 20 may identify clusters in step 22 by determining a geographic source location of the client communication that was the original basis of the formatted electronic record. Location-based processing can be applied when analyzing the content of the message.

In an automobile insurance context, examples of clusters include: medical information, eye witness and police reports, structural damage reports, client account information, insurance policy, etc.

In the client identification step 23, the record distribution system 20 associates the electronic document with a particular client, file, event, customer, project, etc. In an automobile insurance context, the record distribution system 20 may associate the electronic document with a particular policy or claim.

In the associate with department or business unit step 24, the record distribution system 20 identifies the department(s) or business unit(s) charged with responsibility for handling the cluster(s) identified at step 22 for a particular electronic document. The department or business unit may be an individual person, a team of persons, or a system.

In the route step 25, the record distribution system 20 routes or adds the electronic document to the workflow for the associated department(s) or business unit(s) 31 charged with handling the identified cluster(s). The electronic document may be routed to a plurality of associated departments or business units serially or in parallel. When routed in parallel, copies of the electronic document are simultaneously routed to the plurality of associated departments or business units.

As shown in FIG. 1, from the record distribution system, the electronic document is communicated to the record handling system 30 where the electronic document is received by an associated department(s) or business unit(s) 31 charged with handling the identified cluster(s). In FIG. 1, departments A, B and C are illustrated as an example. In most cases, the associated department(s) or business unit(s) 31 charged with handling the identified cluster(s) will simply process at step 36 the question or information contained in the cluster identified in the electronic document. Upon processing, the matter is considered done and the flow ends at step 37.

However, in some cases, the associated department(s) or business unit(s) 31 will further recognize that the electronic document needs to again be handled by the record distribution system 20 because the electronic document contains an additional question or information as yet unprocessed. This is called reflowing the electronic document. FIG. 1 illustrates a reflow process, wherein a department or business unit 31 may revise at step 35 a system record for an electronic document. The department or business unit 31 may then identify at step 32 new clusters relative to the electronic document. The department or business unit 31 may then identify at step 34 the department(s) or business unit(s) charged with responsibility for handling the cluster(s) identified at step 32 for a particular electronic document. As before, the department or business unit may be an individual person, a team of persons, or a system. The record handling system 30 then sends the electronic record to the record distribution system 20 for routing at step 25 so that the electronic record is again routed and added to the workflow of the department or business unit 31 charged with handling the newly associated cluster. In a reflow process, a customer representative may: identify new cluster by highlighting or circling on the screen (e.g., an embedded question related to another issue outside the representative's scope of work); categorize and route that electronic document directly to the appropriate customer representative for the new cluster.

Alternatively, a reflow of an electronic document happens when the system record is revised at step 35 and the electronic document is returned to the record distribution system 20 so that the system automatically processes the new cluster at step 22.

According to one embodiment of the invention, when customer sends an email, the record distribution system analyzes the natural language and identifies an appropriate pre-defined category or cluster. Language heuristics may be used for this purpose. A customer may log into a portal so that the system knows customer's identity. In an automobile insurance context, if there is an existing claim for a car wreck, the system may identify, for example: an injury representative or team, a vehicle damage representative or team, and a police representative or team. The claim page visible to the customer may list claim representatives, but hides the specific contact information. Customers may present information in the form of an email. The customer may be presented stock categories or clusters in which to present information or questions. The record distribution system 20 may use natural language processing to: categorize line of business (auto, fire); categorize the type of inquiry; identify a legal question; identify a billing question. The record distribution system 20 may further route (route to multiple destinations) the electronic document. The record distribution system 20 may further identify sub-parts within the electronic document for identification of multiple clusters or categories of information/questions.

In one embodiment of the invention, the intake system 10 uses a form internal email message so that the electronic document is properly coded and routed. The form internal email message ensures that a document category is be assigned and that the system record provides: file documentation; coding of the email and coding of the attachment; and identification as incoming correspondence.

In one embodiment of the reflow process, a manual rerouting step may be used if an electronic record is misrouted or there is an additional aspect of the electronic record that requires: reassigning the question/information; the system learning from error or nuance; or manual categorization of sub-parts.

In one example of an auto insurance context, a customer wants to submit a photo of a damaged fender of an automobile. The customer logs in and writes, "Here is a picture of the damaged fender." They system creates an email coded as a file documentation email and routes it to auto property representative, where the image is coded as file documentation and routed to auto property representative.

Figure 2:
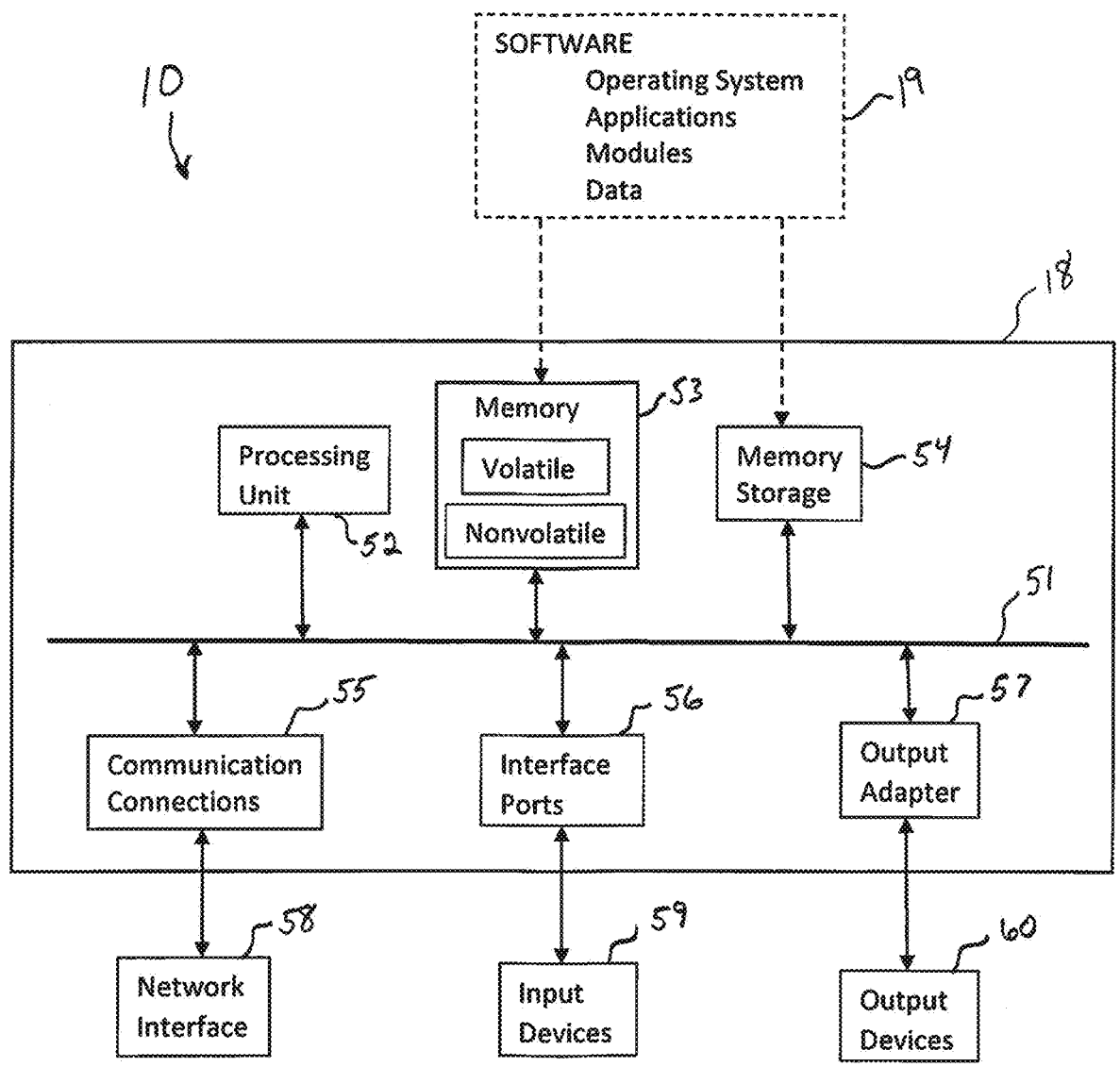
FIG. 2 shows a schematic diagram of an intake system of the present invention.

Referring to FIG. 2, a schematic diagram of an embodiment of an intake system 10 is illustrated. The intake system may comprise a hardware system 18 that has a network bus 51 over which other components communicate. The intake system may comprise a communications network and may be a local area network (LAN) or a wide area network (WAN). The intake system network 10 may include any suitable technology, such as Public Switched Telephone Network (PSTN), Ethernet, 302.11g, SONET, etc. A processing unit 52 is connected to the network bus 51. Both memory 53 and memory storage 54 are also connected to the network bus 51. The memory 53 may comprise volatile and nonvolatile memory. Software 19 may be stored on either or both of the memory 53 and the memory storage 54, wherein the software 19 may include an operating system, applications, modules and data. Communication connections 55 are connected to the network bus 51 so that network interfaces 58 may communicate with the hardware system 18. Interface ports 56 are connected to the network bus 51 so that input devices 59 may communicate with the hardware system 18. Output adapter 57 is connected to the network bus 51 so that the hardware system 18 may communicate with output devices 60. The intake system may comprise client network client devices and network server devices connected to a communications network. Any number of clients and servers may be implemented. Also, in some instances, a client may perform the functions of a server and a server may perform the functions of a client device. Additionally, the client devices can connect to the communications network and exchange data with other devices in their respective networks or other networks.

Figure 3:
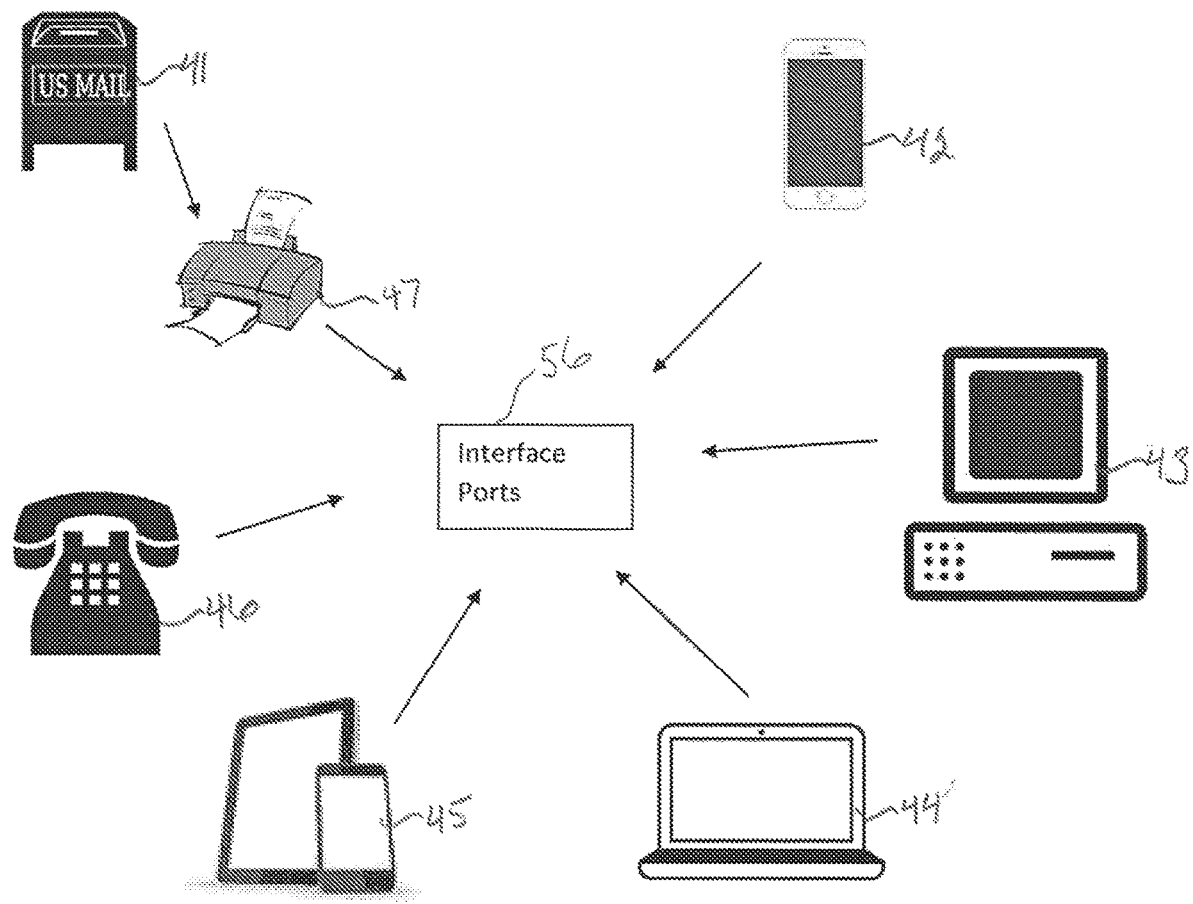
FIG. 3 illustrates a variety of input devices that input client communications to an intake system.

As shown in FIG. 3, the intake system 10 may receive client messages from a variety of sources. Client communications may be received by a postal service 41 and the messages and information may be converted to an electronic format via a scanner 47. Electronic client communications may be received from smart phones 42, home computers 43, laptop computers 44 and tablet computers 45. Verbal client communications may be received via telephones 46, which of course may be recorded and/or converted to an electronic format by any means or system known to persons of skill. These devices are input devices 59 (see FIG. 2) that communicate with input ports 56 of the hardware system 18 of the intake system 10.

A record distribution system 20 may comprise hardware and software components similar to that illustrated in FIG. 2 for the intake distribution system 10. The hardware and software components of the record distribution system may be configured to create system records 21, identify clusters 22, identify clients and save system records to client files 23, identify departments charged with handling clusters 24, and routing system records to departments 25. (See FIG. 1).

Figure 4:
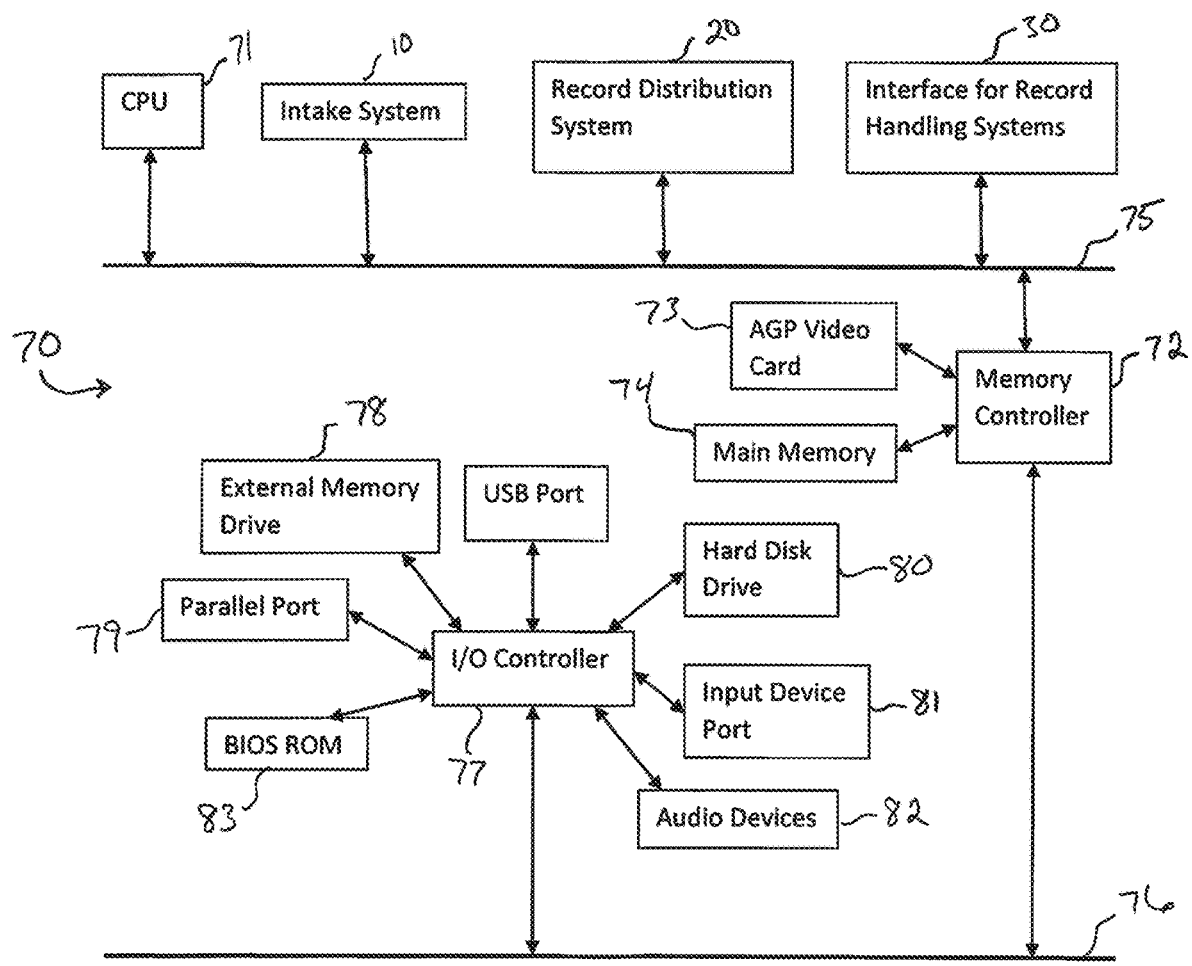
FIG. 4 illustrates a schematic diagram of a computer communication network for processing and routing client communications based on information contained in the communications, wherein an intake system, a record distribution system and a record handling system communicate over a network bus.

FIG. 4 illustrates a communication network 70 that may provide what is needed for the intake system 10, the record distribution system 20 and the interface for record handling systems 30 to communicate and process client information and system records. The network may comprise a computer system with components in communication with a system bus, including: a CPU 71; an intake system 10; a record distribution system 20; an interface for a record handling system 30; and a memory controller 72. The memory controller 72 may be connected via a bus to an AGP video card 73, and may be connected to a main memory 74. The main memory 74 may comprise any suitable memory, for example, random access memory (RAM), extended data output RAM, synchronous dynamic RAM, etc. The intake system 10, record distribution system 20, and interface for a record handling system 30 may each comprise hardware/software modules for processing communications, commands, or other information. These hardware/software modules are illustrated in communication with the system bus 75. In alternative embodiments, these hardware/software modules may be in communication with a different bus or device within the network 70, such as an expansion bus 76. The hardware/software modules for the intake system 10, the record distribution system 20, and the interface for the record handling system 30 can include software modules that utilize main memory 74. An expansion bus may also communicate with the memory controller 72 and to an input/output (I/O) controller 77. Some systems may also comprise a peripheral component interconnect (PCI) bus, PCIX bus, PC Card bus, CardBus bus, InfiniBand bus, or an industry standard architecture (ISA) bus, etc. The I/O controller 77 communicates with an external memory drive 78, a parallel port 79, a hard disk drive 80, an input device port 81, an audio device 82 and a BIOS ROM 83. Access to the I/O Controller 77 may also be had through a USB Port 84. Additional peripheral devices and/or more than one of each component illustrated may be included. In particular, the system may include a plurality of external CPUs. Any component of the system can be implemented as hardware, firmware, and/or machine-readable media including instructions for performing the operations described herein.

Figure 5:
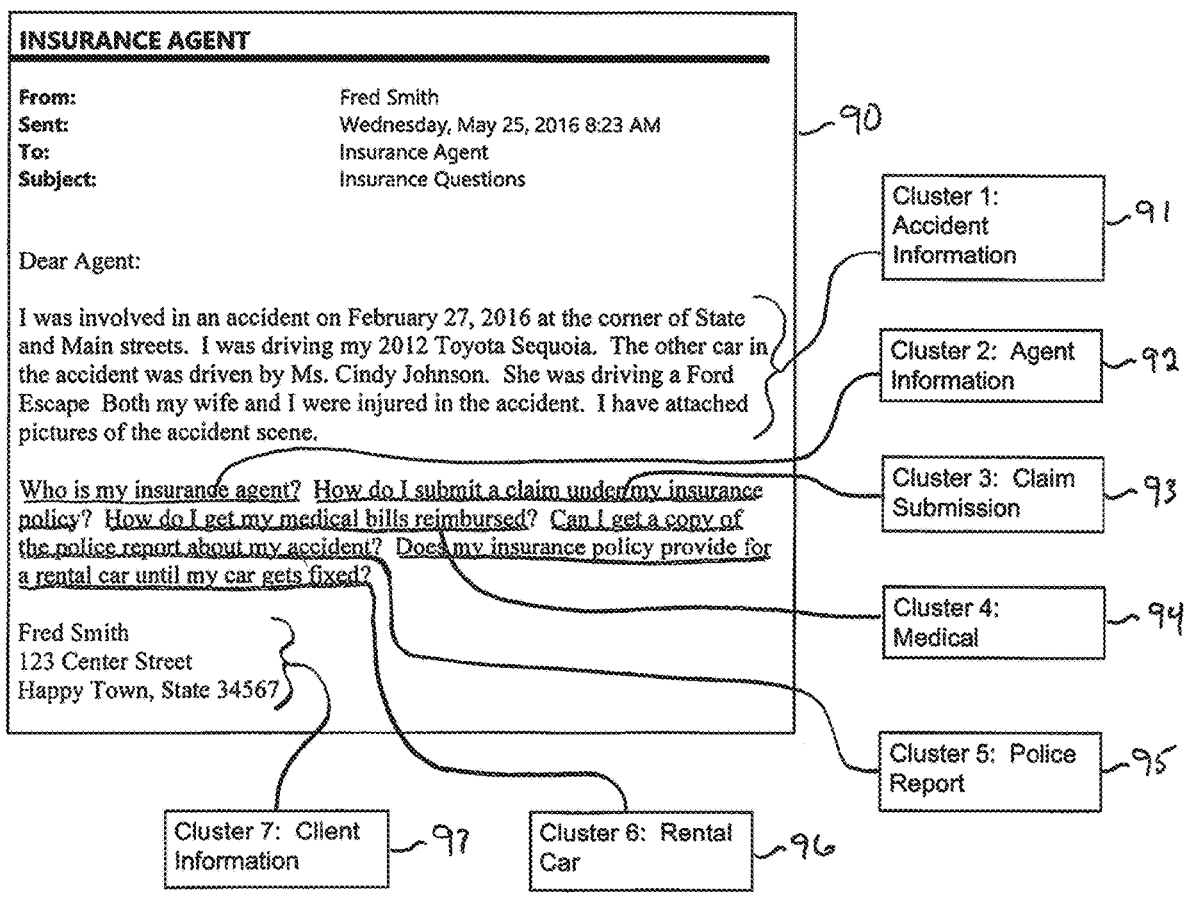
FIG. 5 shows and illustrative email client communication with identified clusters of information.

FIG. 5 illustrates a client communication in the form of an email. The email 90 may be processed by the intake system 10 and the record distribution system 20 to identify clusters. This illustrative email 90 relates to an automobile insurance business entity. Automobile accident information is identified as a cluster 91. Insurance agent information is identified as cluster 92 Information related to claim submission is identified as cluster 93. Medical information is identified as cluster 94. Information about police reports is identified as cluster 95. Questions and information about a rental car is identified as cluster 96. Client identification information is identified as cluster 97. Because more than one cluster is identified for this particular client communication, the record distribution system 20 may simultaneously route multiple copies of the system record and formatted electronic record for this email 90 to the corresponding departments or business units.

In this disclosure, the term "client" means any individual or entity that may be offered a product or service by a business entity. A client may be a new, former, prospective or current client of that business entity. The term "business entity" may include an insurance carrier, a financial services business entity, an independent sales agency, a non-profit or governmental entity for pooling risk, or any other entity offering products or services to clients.

Although the disclosed embodiments are described in detail in the present disclosure, it should be understood that various changes, substitutions and alterations can be made to the embodiments without departing from their spirit and scope.

What is claimed is:

1. A computer communication network for processing and routing client communications based on information contained in the communications, the computer network comprising:
   (i) an intake system comprising:
      a non-transitory computer readable media having stored thereon at least one intake software application;
      a processor, wherein said processor upon execution of the intake software application, is configured to:
         receive client communications in one or more formats selected from verbal, electronic, and physical;
         convert the received client communications into formatted electronic records; and
         transmit the formatted electronic records;
   (ii) a record distribution system comprising:
      a non-transitory computer readable media having stored thereon at least one distribution software application;
      a processor, wherein said processor upon execution of the distribution software application, is configured to:
         receive the formatted electronic records from the intake system;
         create system records for the formatted electronic records;
         identify clusters from the information in the formatted electronic records;
         categorize the identified clusters;
         identify clients from the information in the formatted electronic records;
         save the system records and the formatted electronic records in data files for the identified clients;
         identify business departments charged with handling identified clusters; and
         route the system records and formatted electronic records to the identified business departments, wherein the system records and formatted electronic records are added to workflow of the business departments; and
   (iii) a record handling system that allows users to process system records and formatted electronic records.

2. A computer communication network as claimed in claim 1, wherein said identify clusters from the information in the formatted electronic records comprises identifying key words or phrases in the formatted electronic records.

3. A computer communication network as claimed in claim 1, wherein said identify clusters from the information in the formatted electronic records comprises performing topic extraction on the formatted electronic records.

4. A computer communication network as claimed in claim 1, wherein said identify clusters from the information in the formatted electronic records comprises performing Natural Language Processing on the formatted electronic records.

5. A computer communication network as claimed in claim 1, wherein said route the system records and formatted electronic records to the identified business departments comprises making multiple copies of individual system records and formatted electronic records and simultaneously routing the multiple copies to the identified business departments.

6. A computer communication network as claimed in claim 1, wherein the record handling system further allows users to: identify previously unidentified clusters from the information in the formatted electronic records.

7. A computer communication network as claimed in claim 1, wherein the record handling system further allows users to: identify business departments charged with handling previously unidentified clusters from the information in the formatted electronic records.

8. A computer communication network as claimed in claim 1, wherein the processor, wherein said processor upon execution of the distribution software application, is further configured to: process the formatted electronic records with a machine learning algorithm.

* * * * *